United States Patent
Carey et al.

(10) Patent No.: US 11,852,067 B2
(45) Date of Patent: Dec. 26, 2023

(54) SYSTEMS AND METHODS OF USING DIESEL PARTICULATE FILTER HEATER AS A LOAD BANK

(71) Applicant: THERMO KING LLC, Minneapolis, MN (US)

(72) Inventors: Adam B Carey, Cottage Grove, MN (US); James Goodsell, Lakeville, MN (US); Grant A. Baumgardner, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/682,490

(22) Filed: Feb. 28, 2022

(65) Prior Publication Data

US 2023/0272731 A1    Aug. 31, 2023

(51) Int. Cl.
| | | |
|---|---|---|
| F01N 9/00 | (2006.01) |
| F01N 3/035 | (2006.01) |
| F01N 11/00 | (2006.01) |
| F01N 3/027 | (2006.01) |
| F02D 41/02 | (2006.01) |

(52) U.S. Cl.
CPC ............ *F01N 9/002* (2013.01); *F01N 3/027* (2013.01); *F01N 3/035* (2013.01); *F01N 11/002* (2013.01); *F02D 41/029* (2013.01); *F01N 2560/06* (2013.01)

(58) Field of Classification Search
CPC .......... F01N 9/002; F01N 3/027; F01N 3/035; F01N 11/002; F01N 2560/06; F02D 41/029
See application file for complete search history.

(56) References Cited

U.S. PATENT DOCUMENTS

| | | | |
|---|---|---|---|
| 11,365,662 B2 * | 6/2022 | Brahma | ............... F02D 41/401 |
| 2006/0168952 A1 * | 8/2006 | Opris | ................... F01N 3/027 |
| | | | 60/297 |

(Continued)

FOREIGN PATENT DOCUMENTS

| | | |
|---|---|---|
| WO | 2013134238 | 9/2013 |
| WO | 2019036344 | 2/2019 |

OTHER PUBLICATIONS

Extended European Search Report, issued in the corresponding European patent application No. 23158951.6, dated May 23, 2023, 7 pages.

*Primary Examiner* — Matthew T Largi
(74) *Attorney, Agent, or Firm* — Hamre, Schumann, Mueller & Larson, P.C.

(57) ABSTRACT

Systems and methods for using a diesel particulate filter (DPF) heater as a load bank to maintain a minimum exhaust temperature for a diesel oxidation catalyst (DOC) paired with a prime mover are provided. The system includes a prime mover coupled with a generator, a compressor powered by the prime mover, a DOC disposed downstream from the prime mover, and a controller. The prime mover is separate from another prime mover used for operating a vehicle. The controller is configured to determine a load of the generator, to determine a load of the compressor, to determine a load of the prime mover based on the determined load of the generator and the determined load the compressor, and to control the load of the prime mover to maintain a minimum exhaust temperature for the DOC.

18 Claims, 6 Drawing Sheets

(56) References Cited

U.S. PATENT DOCUMENTS

| | | | |
|---|---|---|---|
| 2010/0307139 A1* | 12/2010 | Li | F01N 3/027 60/299 |
| 2011/0251756 A1* | 10/2011 | Major | F02D 41/0087 701/102 |
| 2012/0003131 A1* | 1/2012 | Ibrahim | B01D 46/58 422/177 |
| 2014/0137590 A1* | 5/2014 | Chopko | F04B 35/002 62/323.1 |
| 2014/0352277 A1* | 12/2014 | Silvers | F02D 41/024 60/274 |
| 2015/0338858 A1* | 11/2015 | Bates | G05D 23/00 62/157 |
| 2018/0094556 A1* | 4/2018 | Kurtz | F01N 3/027 |
| 2019/0360689 A1* | 11/2019 | Bartolo | F02D 19/0642 |
| 2020/0165992 A1* | 5/2020 | Stockbridge | F02D 9/08 |

* cited by examiner

SYSTEMS AND METHODS OF USING DIESEL PARTICULATE FILTER HEATER AS A LOAD BANK

FIELD

This disclosure relates generally to controlling a diesel particulate filter (DPF) heater used for regenerating a DPF. More specifically, the disclosure relates to systems and methods for using the DPF heater as a load bank to maintain a minimum exhaust temperature for a diesel oxidation catalyst (DOC) paired with a prime mover.

BACKGROUND

A transport climate control system (TCCS) can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

This disclosure relates generally to controlling a DPF heater used for regenerating a DPF. More specifically, the disclosure relates to systems and methods for using the DPF heater as a load bank to maintain a minimum exhaust temperature for a DOC paired with a prime mover.

Embodiments disclosed herein can provide a heater (e.g., a DPF heater) to draw additional load from the system to drive up the exhaust temperature when the prime mover is running. That is, when deposits start to form on the DOC (and/or the DPF), embodiments disclosed herein can provide this artificial load (i.e., the DPF heater) as a load bank to raise the exhaust temperature so that the DOC (and/or the DPF) can burn the deposit off, and to mitigate any deposit formation the DOC (and/or the DPF) may have. In addition, the running of the DPF heater (as a load bank) can help with DPF regeneration.

In some applications, when the prime mover (e.g., a diesel engine of the APU, or the like) is being warmed up, exhaust gas may flow out of the tailpipe and generate "white smoke" which can be noxious or toxic. Embodiments disclosed herein can provide a heater to heat up the exhaust gas and help to make the "white smoke" disappear sooner.

It will be appreciated that in some embodiments the prime mover (e.g., a diesel engine of the APU, or the like) disclosed herein is not the prime mover used for operating the vehicle. The prime mover disclosed herein can be separate from and/or independent to the prime mover used for operating the vehicle. In some applications, when the prime mover used for operating the vehicle is running, the prime mover (e.g., a diesel engine of the APU, or the like) disclosed herein typically can be off, and vice versa. It will be appreciated that embodiments disclosed herein can be applied to applications where a device (e.g., a heater such as a DPF heater, or the like) uses electricity to increase load on the prime mover to generate heat.

In an embodiment, a diesel particulate matter reduction system is provided. The system includes a prime mover coupled with a generator, a compressor powered by the prime mover, a DOC disposed downstream from the prime mover, and a controller. The prime mover is separate from another prime mover used for operating a vehicle. The controller is configured to determine a load of the generator, to determine a load of the compressor, to determine a load of the prime mover based on the determined load of the generator and the determined load the compressor, and to control the load of the prime mover to maintain a minimum exhaust temperature for the DOC.

In an embodiment, a method for maintaining a minimum exhaust temperature for a DOC paired with a prime mover is provided. The prime mover is separate from another prime mover used for operating a vehicle. The method includes determining a load of a generator, the generator being coupled with the prime mover. The method also includes determining a load of a compressor, the compressor being powered by the prime mover. The method further includes determining a load of the prime mover based on the determined load of the generator and the determined load the compressor. Also the method includes controlling the load of the prime mover to maintain the minimum exhaust temperature for the DOC, the DOC being disposed downstream from the prime mover.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1A:
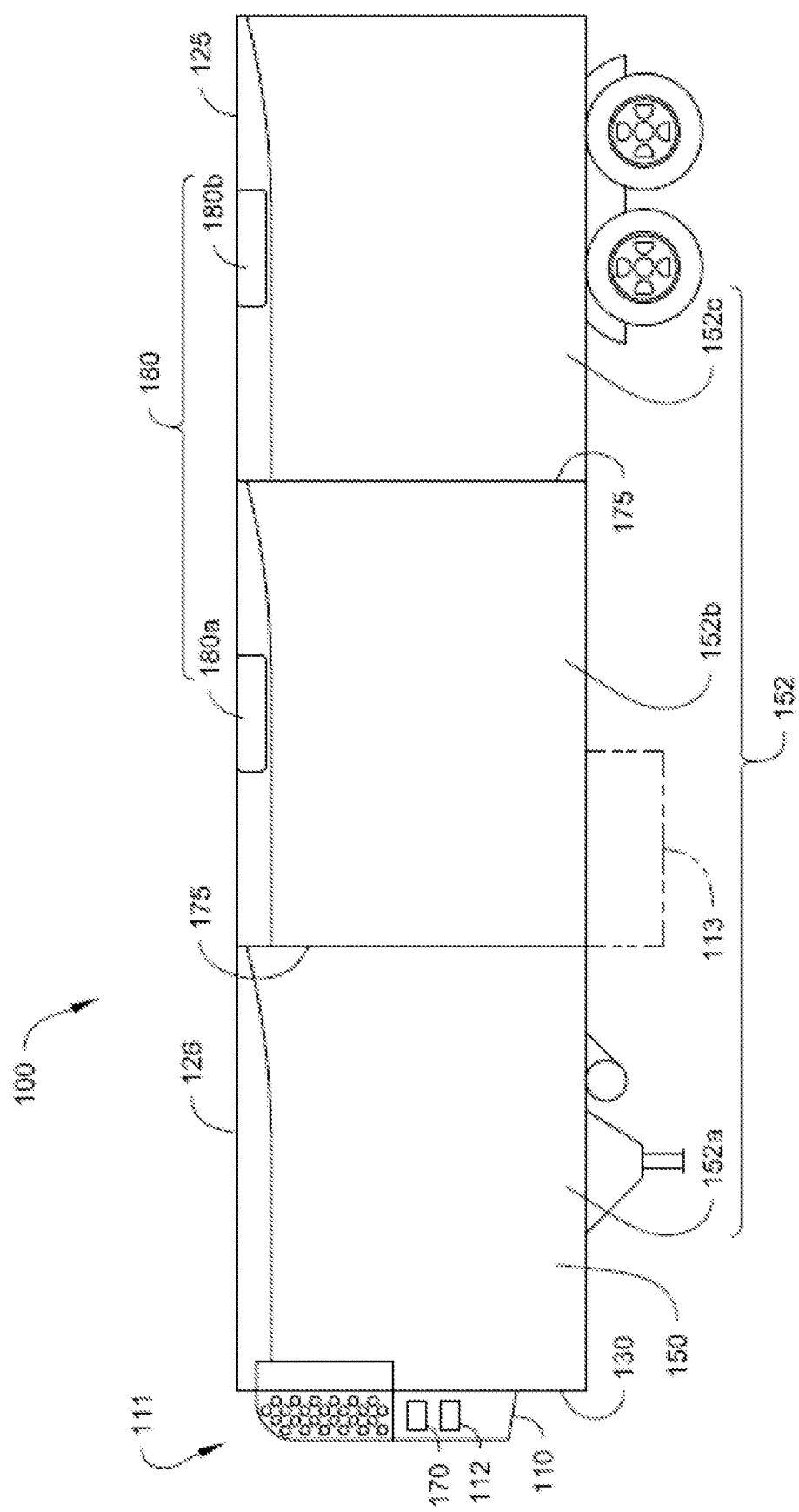
FIG. 1A illustrates a schematic cross sectional side view of a refrigerated transport unit with a multi-temp transport refrigeration system (MTRS), according to an embodiment.

This disclosure relates generally to controlling a DPF heater used for regenerating a DPF. More specifically, the disclosure relates to systems and methods for using the DPF heater as a load bank to maintain a minimum exhaust temperature for a DOC paired with a prime mover.

As defined herein, the phrase "diesel particulate filter" or "DPF" may refer to a device designed to remove e.g., diesel particulate matter, soot, or the like from the exhaust gas of a prime mover (e.g., a diesel powered compression ignition engine, or the like). It will be appreciated that unless specified otherwise, a prime mover described herein refers to a prime mover of an auxiliary power unit (APU), a prime mover of a TCCS, or the like, but not to a vehicle prime mover. That is, in some embodiments, there can be two or more distinct diesel engines on a same vehicle: one can be a main/vehicle (e.g., tractor, truck, or the like) engine, and the other can be a diesel powered compression ignition engine (the auxiliary engine) of the APU, TRU, or the like. Typically when the main/vehicle engine is running, the APU engine is off, and vice versa. It will be appreciated that in some embodiments an electric prime mover might not work with a diesel particulate filter. Embodiments disclosed herein can be directed to the diesel particulate filter for the auxiliary diesel powered compression ignition engine.

As defined herein, the phrase "diesel particulate filter heater" or "DPF heater" may refer to a heater (e.g., an electric heater or the like) powered by a power source (e.g., a generator coupled with the prime mover of the APU, or the like) so that the DPF can perform DPF regeneration for the collected particulate (e.g., soot or the like). In some embodiments, the DPF heater can be disposed inside the DPF and/or integrated with the DPF. In other embodiments, the DPF heater can be independent to, separated from, and/or disposed upstream from the DPF.

It will be appreciated that some embodiments of the DPF and the DPF heater are described in U.S. patent application Ser. No. 17/363,969, which is incorporated by reference herein in its entirety.

As defined herein, the phrase "upstream" may refer to an opposite direction from that in which air flows (e.g., in and through an exhaust system of a prime mover of an APU), and/or refer to nearer to the air source. The phrase "downstream" may refer to the direction in which air flows, and/or refer to away from the air source.

As defined herein, the phrase "diesel oxidation catalyst" or "DOC" may refer to a catalytic converter, which can be an exhaust emission control device that converts toxic gases and pollutants in exhaust gas from a prime mover (e.g., an internal combustion engines fueled by gasoline or diesel) into less-toxic pollutants by catalyzing a redox reaction. It will be appreciated that DOCs may contain palladium and/or platinum supported on alumina. DOCs can convert particulate matter (PM), hydrocarbons, and carbon monoxide to carbon dioxide and water. DOCs can also eliminate or reduce diesel odor and help reduce visible particulates.

Embodiments disclosed herein can be applicable to e.g., box truck, self-powered truck, trailer, TRU, or the like, or dual prime mover system where a prime mover is independent to a vehicle prime mover. It will be appreciated that the control of the components of the system can be performed by a controller (e.g., the APU controller, the TCCS controller, or the like).

FIG. 1A illustrates one embodiment of a MTRS 100 for a TU 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1A, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. In some embodiments, the prime mover can include a DOC to convert toxic gases and pollutants in exhaust gas into less-toxic pollutants, and a DPF to collect particulate such as carbon, soot, or the like that comes out of the tail pipe. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

The MTRS 100 for the TU 125 includes the TRU 110 and a plurality of remote evaporator units 180. In some embodiments, an HVAC system can be powered by an Auxiliary Power Unit (APU, see FIG. 1B). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the tractor (not shown). The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system for supplying electrical power to the electrical loads of the tractor, the MTRS 100, and/or the TU 125.

Figure 1B:
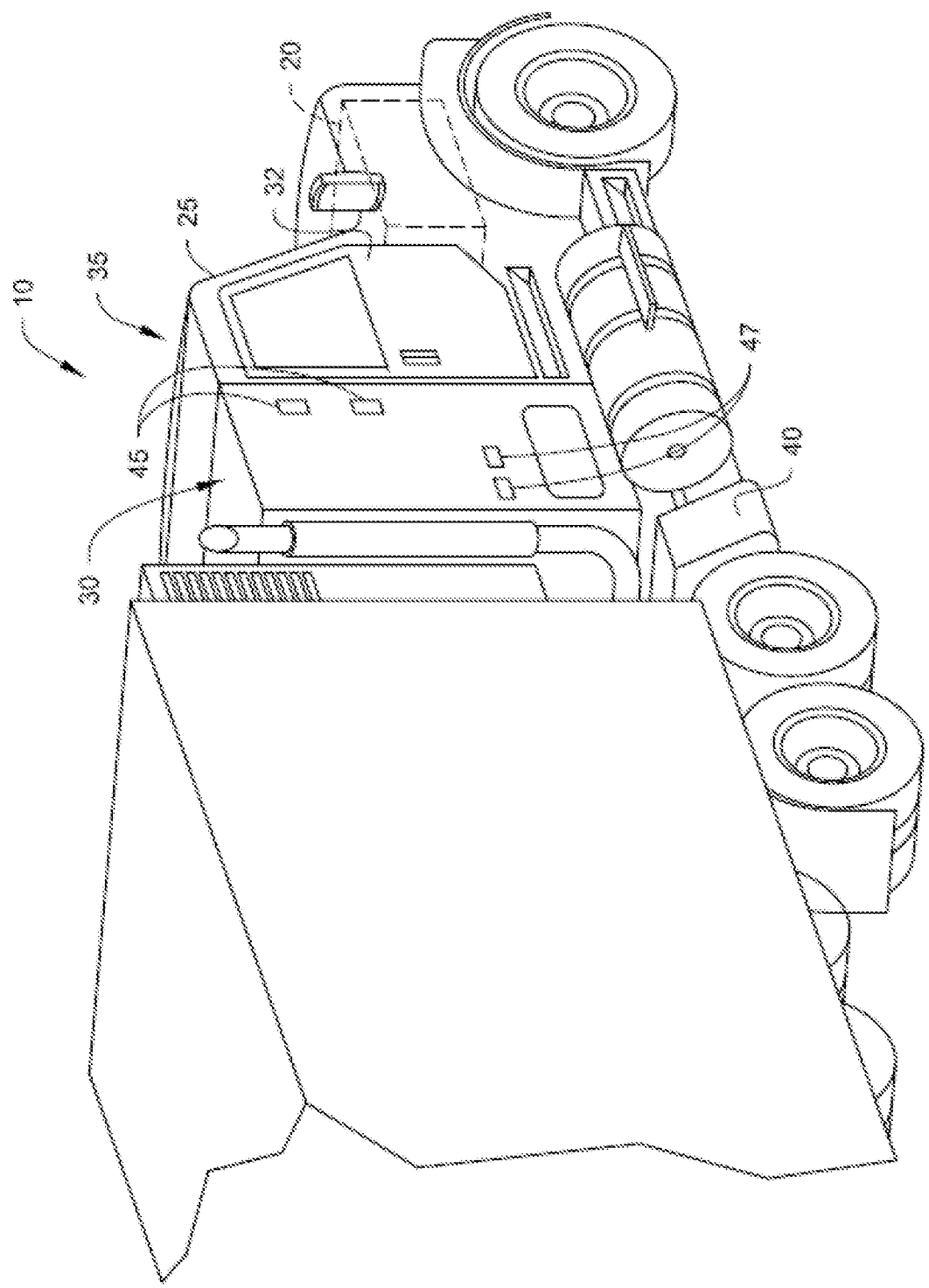
FIG. 1B illustrates a perspective view of a vehicle with an APU, according to an embodiment.

FIG. 1B illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the present application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41. In some embodiments, the APU 40 can include a prime mover that can include a DOC to convert toxic gases and pollutants in exhaust gas into less-toxic pollutants, and a DPF to collect particulate such as carbon, soot, or the like that comes out of the tail pipe.

Figure 1C:
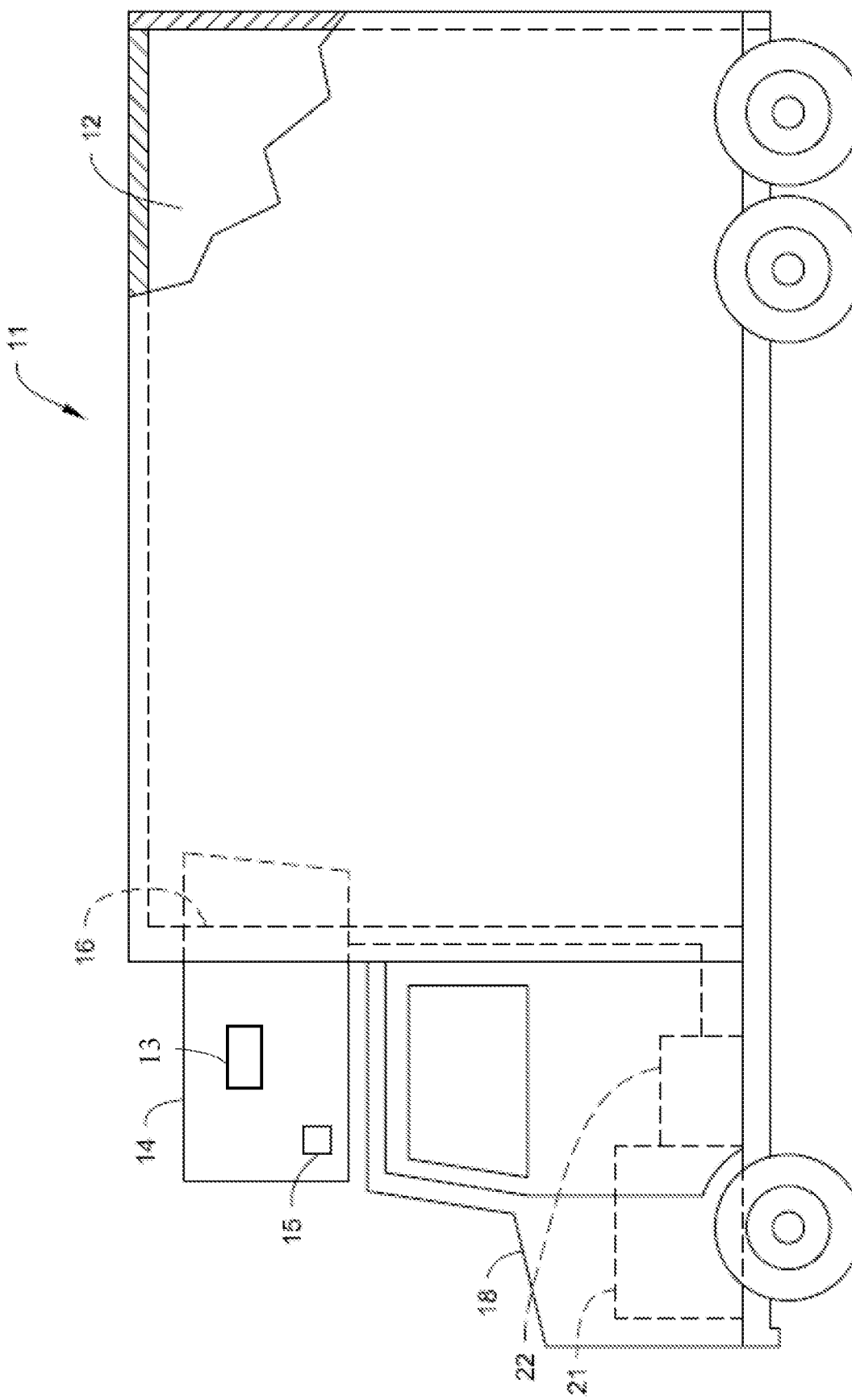
FIG. 1C illustrates a side view of a truck with a front wall mounted vehicle powered transport refrigeration unit, according to an embodiment.

FIG. 1C depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a truck prime mover 21, such as a combustion engine (e.g., diesel engine, etc.), that provides power to move the truck 11. In some embodiments, the truck prime mover 21 can work in combination with an optional machine 22 (e.g., an alternator). The TRU 14 includes a prime mover 13. In an embodiment, the prime mover 13 can be a combustion engine (e.g., diesel engine, etc.) to provide power to the TRU 14. In some embodiments, the prime mover 13 can include a DOC to convert toxic gases and pollutants in exhaust gas into less-toxic pollutants, and a DPF to collect particulate such as carbon, soot, or the like that comes out of the tail pipe. In one embodiment, the TRU 14 includes a vehicle electrical system. Also, in some embodiments, the TRU 14 can be powered by the prime mover 13 in combination with a battery power source or by the optional machine 22. In some embodiments, the TRU 14 can also be powered by the truck prime mover 21 in combination with a battery power source or the optional machine 22.

While FIG. 1C illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit.

Figure 2:
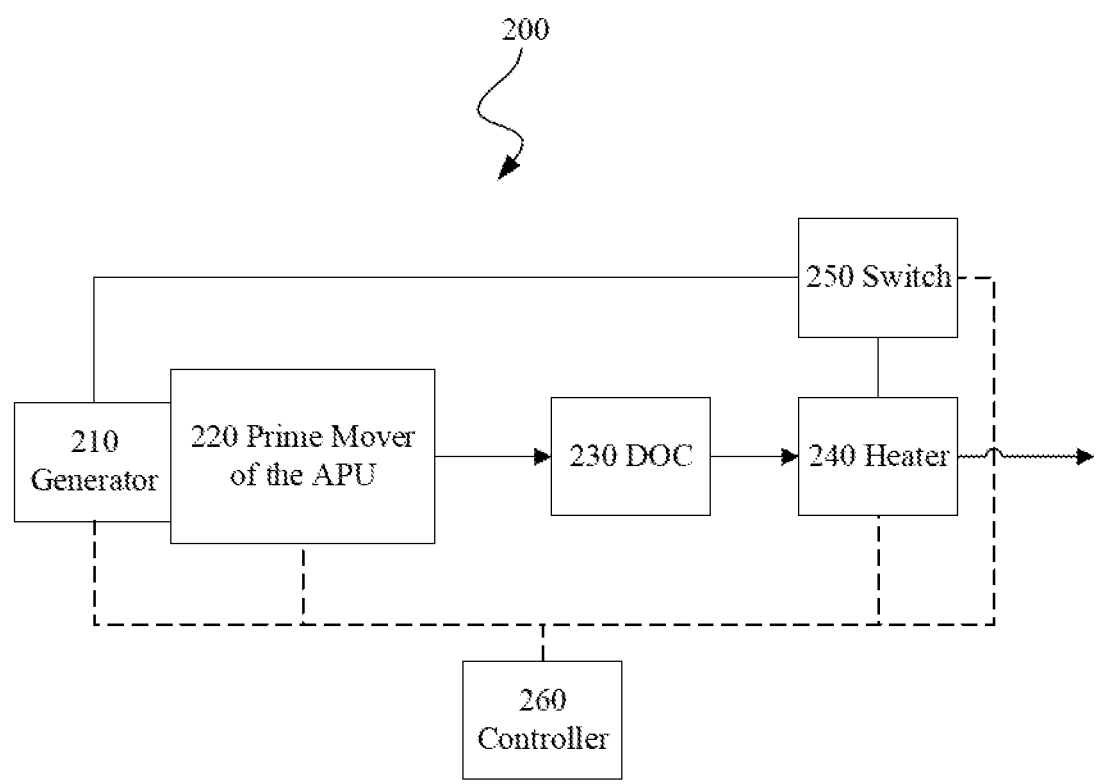
FIG. 2 illustrates a schematic view of a diesel particulate matter reduction system, according to an embodiment.

FIG. 2 illustrates a schematic view of a diesel particulate matter reduction system 200, according to an embodiment. The system can include, for example, the transport refrigeration unit/system of FIGS. 1A and 1C. The system 200 includes a prime mover 220. The prime mover 220 can be, for example, a prime mover of the APU of FIG. 1B, a prime mover of the transport refrigeration unit/system of FIGS. 1A and 1C, or the like. In some embodiments, the prime mover 220 is separate from a prime mover used for operating a vehicle.

It will be appreciated that the APU or TRU or TCCS can include sensors (e.g., temperature, pressure, humidity, motion, voltage, current, battery status, battery charging level, or the like) or the APU or TRU or TCCS can communicate with sensors associated or embedded with a cargo. The controller of the APU or TRU or TCCS can obtain data sensed by the sensors and control the settings of the components (e.g., the generator 210, the prime mover 220, the switch 250, and the heater 240 of FIG. 2, or the like) of the TCCS or APU. It will be appreciated that the prime mover 220 is not the vehicle prime mover.

In an embodiment, the prime mover 220 can be a combustion engine (e.g., a diesel engine, or the like) of an APU. The prime mover 220 can be coupled with a generator 210 (e.g., a belt-driven alternator, a direct drive generator, or the like). For example, in some embodiments, mechanical energy generated by a diesel engine can be converted into electrical energy via a generator (such as a belt driven alternator). The electrical energy generated via the belt driven alternator can be then converted into DC electrical power via, for example, a bi-directional voltage converter. The APU can be configured to provide power to operate a plurality of cabin accessories such as a refrigerator, a television, a video game console, a microwave, device charging station(s), a continuous positive airway pressure (CPAP) machine, a coffee maker, a secondary HVAC system (that is independent to and/or in addition to a primary HVAC system) for providing conditioned air to the sleeping portion of the cabin. The primary HVAC system and/or the secondary HVAC system can each include a compressor (not shown). In an embodiment, the prime mover 220 can have an engine shaft, and the compressor and the generator 210 can be the two main mechanical loads on the shaft.

The system 200 also includes a diesel oxidation catalyst (DOC) 230. It will be appreciated that the DOC 230 can be attached to the prime mover 220 to convert toxic gases and pollutants in exhaust gas (for example that comes out of the tail pipe of the prime mover 220) into less-toxic pollutants. The DOC 230 is disposed downstream of the prime mover 220 with respect to the exhaust gas.

The system 200 further includes a switch (e.g., a switched electrical device such as a relay, a contactor, or the like) 250 configured to turn on or off a heater 240.

In some embodiments, the system 200 can also include a diesel particulate filter (DPF) (not shown). It will be appreciated that the DPF can be attached to the prime mover 220 to collect particulate such as carbon, soot, or the like that comes out of the tail pipe. It will also be appreciated that some DPFs are designed to burn off the accumulated particulate either passively through the use of a catalyst or by active means such as a heater 240 which is controlled to heat the DPF to a desired temperature (e.g., soot combustion temperatures) to burn off the accumulated particulate.

The generator 210 can be configured to power the heater 240 via the switch 250. As shown in FIG. 2, the solid lines indicate the power lines. The dotted lines indicate the control lines. Controls described herein can be performed by a controller (e.g., the controller of the transport refrigeration unit/system of FIGS. 1A and 1C, the controller of the APU of FIG. 1B, or the like). The controller can connect to and control the components of FIG. 2 via e.g., wireless or wired connections.

As shown in FIG. 2, the arrows indicate the exhaust gas/air flow. It will be appreciated that connections (e.g., the arrows) between the components of FIG. 2 can be achieved via e.g., pipes, manifolds, or the like. The prime mover 220 and/or pipe design are configured to facilitate the airflow direction. In an embodiment, the heater 240 can be independent to, separated from, and/or disposed upstream from the DPF (and/or downstream or upstream from the DOC 230). In another embodiment, the heater 240 can be disposed inside and/or integrated with the DPF.

Figure 3:
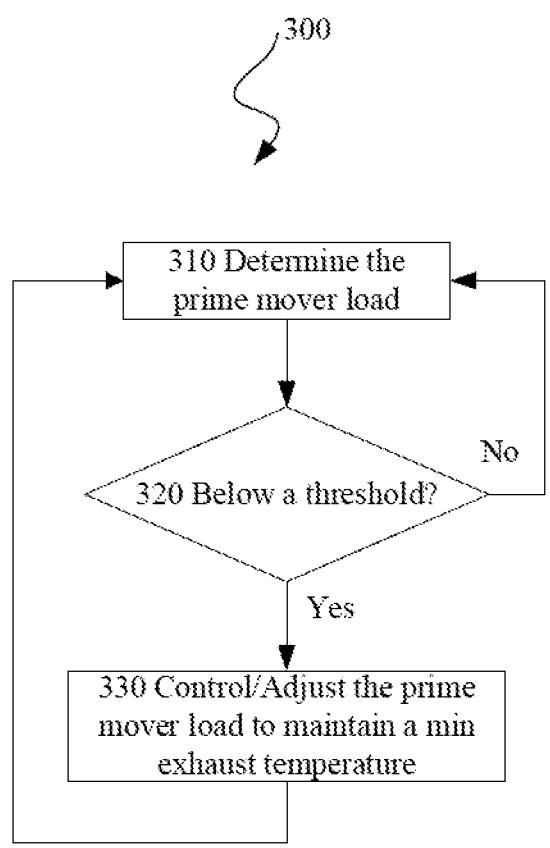
FIG. 3 is a flow chart illustrating a method of using a diesel particulate filter (DPF) heater as a load bank to maintain a minimum exhaust temperature for a transport climate control system, according to an embodiment.

FIG. 3 is a flow chart illustrating a method 300 of using a diesel particulate filter (DPF) heater as a load bank to maintain a minimum exhaust temperature for a DOC paired with a prime mover, according to an embodiment.

It will be appreciated that the method 300 disclosed herein can be conducted by a controller (e.g., the controller of the transport refrigeration unit/system of FIGS. 1A and 1C, the controller of the APU of FIG. 1B, or any suitable processor(s)), unless otherwise specified. The controller can include a processor, memory, and/or communication ports to communicate with e.g., other components of the TCCS or APU or with equipment or systems located in proximity to the TCCS or APU or a cargo load. The controller can communicate with other components using e.g., powerline communications, Pulse Width Modulation (PWM) communications, Local Interconnect Network (LIN) communications, Controller Area Network (CAN) communications, etc., and using any suitable communications including wired and/or wireless, analog and/or digital communications. In an embodiment, the communication can include communications over telematics of the TCCS or APU, which the TCCS or APU may include or which may be communicatively connected to the TCCS (e.g., telematics equipment, mobile phone, vehicle communication system, etc.). The TCCS or APU can include sensors (e.g., temperature, pressure, humidity, motion, voltage, current, battery status, battery charging level, or the like) or the TCCS or APU can communicate with sensors associated or embedded with a cargo. The controller can obtain data sensed by the sensors and control the settings of the components (e.g., the generator 210, the prime mover 220, the heater 240 (and/or the DPF), the switch 250 of FIG. 2, or the like) of the TCCS or APU.

It will also be appreciated that the method 300 can include one or more operations, actions, or functions depicted by one or more blocks. Although illustrated as discrete blocks, various blocks may be divided into additional blocks, combined into fewer blocks, or eliminated, depending on the desired implementation. The method 300 begins at 310.

At 310, the controller performs a sequence of initializations for controlling a load of a prime mover (e.g., the prime mover 220 of FIG. 2). The initializations can include e.g., the controller determining (e.g., measuring, estimating, or the like) a load of the prime mover. It will be appreciated that a "load" of a device can be represented by a power (in the unit of e.g., kilowatts) required to run the device, a power drawn from the device, or a power demanded from the device, or the like.

In an embodiment, the load of the prime mover can be determined based on a load of the compressor (that is powered by the prime mover) and a load of the generator (e.g., the generator 210 of FIG. 2). In an embodiment, the load of the prime mover can be a sum of the load of the compressor and the load of the generator, where the compressor and the generator are the two main mechanical loads on the engine shaft of the prime mover.

It will be appreciated that the compressor can be part of a refrigeration circuit (that can include a condenser, an evaporator, an expander or an expansion device, or the like) of the HVAC system powered by the APU. Typically the HVAC system is not a heat-pump system and is configured to provide conditioned air (e.g., to run in a cooling mode) to an occupied space such as the cabin. It will also be appreciated that in the system (e.g., the system 200 of FIG. 2), heating operation may be provided by e.g., a diesel-fired-heater (e.g., fired by the diesel in a tank such as the tractor fuel tank, i.e., heat is generated from the diesel-fired-heater by burning of the diesel fuel).

In an embodiment, the load of the compressor can be determined based on or as a function of the occupied space (e.g., cabin) temperature (as a proxy for the suction pressure of the compressor) and the ambient temperature outside of the transport unit. In another embodiment, the load of the compressor can be determined based on or as a function of the occupied space (e.g. cabin temperature) without the ambient temperature outside of the transport unit. In such embodiment, when the compressor (powered by the APU) is running, the ambient temperature can be estimated (e.g., at or above 50 Fahrenheit degrees). The cabin temperature can be determined by a temperature setpoint or measured by a cabin temperature sensor or via other suitable mechanisms.

As such, the load of the compressor can be determined without using a sensor (e.g., a pressure senor measuring suction and/or discharge pressures, or a temperature sensor measuring an ambient temperature, or the like). In another embodiment, the load of the compressor can be determined based on or as a function of the suction pressure and the discharge pressure of the compressor in a refrigeration circuit.

It will be appreciated that in an embodiment, the load of the compressor can be in the range of zero to at or about three kilowatts. When the compressor is running, the compressor load can be at or above two kilowatts up to at or about three kilowatts.

In an embodiment, the load of the generator can be determined based on or as a function of the current demand (where the voltage is known in specific applications). The current demand can be determined as a sum of all the different currents controlled by the controller that can be either measured (e.g., by sensor(s) or other suitable mechanisms) or estimated (e.g., based on the specific device that draws current from the generator). In an embodiment, a predetermined model or mapping of the generator can be used to convert the current supplied to the mechanical power in the generator as a function of the generator speed and efficiency. That is, in some embodiments, the current production of the alternator/generator can be measured or calculated, but the mechanical load in the application may not be able to be directly measured. In such embodiments, the mechanical energy required to produce a given electrical output can be measured or calculated. A known efficiency of the alternator/generator can be used to back-calculate or measure the mechanical energy input, and by extension the load on the prime mover (e.g., the engine or the like). In an embodiment, the load of the generator can be the sum of all the power drawn/used by the devices that are powered by the generator.

The method 300 proceeds to 320. At 320, the controller determines whether the determined load of the prime mover is below a predetermined threshold (e.g., at or about 1.2 kilowatts, at or about two kilowatts, or at or about 2.2 kilowatts, or the like). If the determined load of the prime mover is at or above the predetermined threshold, the controller determines that no action is needed (regarding the exhaust temperature for the DOC). The method 300 proceeds back to 310 and continues monitoring or determining the load of the prime mover.

It will be appreciated that exhaust temperatures (e.g., of an engine) have been found to be correlated to a load of the prime mover load (i.e., the engine load). Low exhaust temperatures (e.g., of an engine) typically are correlated to a low prime mover load (i.e., the engine load), and high exhaust temperatures (e.g., of an engine) typically are correlated to a high prime mover load (i.e., the engine load). A model or mapping of the prime mover can be determined to correspond the prime mover load to the exhaust temperature.

If the load of the prime mover is below the predetermined threshold, the exhaust temperature (e.g., of the exhaust gas in the tailpipe of the engine) may be below a certain temperature. The DOC (e.g., the DOC 230 of FIG. 2) needs a certain temperature (e.g., at or above 170 Celsius degrees) to actually make the chemical reaction to convert toxic gases and pollutants in exhaust gas into less-toxic pollutants. A low exhaust temperature (e.g., below 170 Celsius degrees) can lead to a deposit formation on the DOC; and at the low exhaust temperature, the DOC may not be able to provide the necessary chemical reaction to convert the exhaust gas going through the DOC which may lead to more deposits on the DOC. As such, the DOC may require a minimum/certain exhaust temperature (e.g., at or about 170 Celsius degrees) for the DOC to perform as desired.

In an embodiment, the minimum exhaust temperature is correlated to the predetermined threshold of the load of the prime mover. To maintain the minimum exhaust temperature (i.e., to keep the exhaust gas temperature in the tailpipe at or above the minimum exhaust temperature so that the DOC can perform as desired), the load of the prime mover needs to be at or above the predetermined threshold.

If the determined load of the prime mover is at or above the predetermined threshold, the DOC may perform as desired, and the controller determines that no action is needed (regarding the exhaust temperature for the DOC). If the determined load of the prime mover is below the predetermined threshold, the controller determines that the load of the prime mover needs to be controlled (adjusted, increased, added, or the like) to maintain the minimum exhaust temperature for the DOC. The method 300 proceeds to 330.

At 330, the controller is configured to control or increase the load of the prime mover to maintain the minimum exhaust temperature for the DOC. In an embodiment, since the load of the prime mover can be determined based on a load of the compressor and a load of the generator, increasing the load of the prime mover can include increasing the load of the generator.

In an embodiment, a heater (e.g., the DPF heater 240 of FIG. 2) may use electrical power (drawn from the generator) to perform DPF regeneration. Typically, when the prime mover is running, there is no need to run the heater (since the temperature of the exhaust gas is high enough for performing a desired DPF regeneration). However, in this embodiment, the heater can be turned on to draw additional load/power from the generator to drive up the exhaust temperature when the prime mover is running. That is, when deposits start to form on the DOC (and/or the DPF), this artificial load (i.e., the DPF heater) can be configured as a load bank to raise the exhaust temperature and so that the DOC (and/or the DPF) can burn the deposit off, and to mitigate deposit formation the DOC (and/or the DPF) may have.

In an embodiment, the controller can be configured to control (e.g., turn on or off) the switch (e.g., the switch 250 of FIG. 2) in order to turn on or off the heater. Once the heater is turned on (from the off status), the load of the generator is increased, the load of the prime mover is increased, and the exhaust temperature is increased. See also FIG. 4.

Back to 330, increasing the load of the prime mover can include increasing the load of the compressor. For example, when the compressor is not running (e.g., when the ambient temperature is not high enough for the HVAC system to run in the cooling mode), the controller can be configured to turn on the compressor (e.g., for a period of time) to increase the load of the compressor (from a load of zero). In another example, when the compressor is running, the controller can be configured to run the compressor at a higher speed/capacity (e.g., for a period of time) to increase the load of the compressor (from the existing load).

In these embodiments, a diesel-fired-heater or the like may need to be turned on to e.g., counteract any extra cooling caused by the cabin compressor so that the cabin may not be too cold. When the compressor is turned off or is controlled back to the previous/original speed/capacity settings (e.g., after the period of "on" time), the diesel-firedheater or the like may need to be turned off since no counteraction is needed any more.

Still at 330, increasing the load of the prime mover can include increasing the load of a plurality of accessory components (e.g., electronic communication devices, cabin lights, a primary and/or secondary HVAC system, primary and/or secondary HVAC fan(s), sunshade(s) for a window/windshield of the vehicle, a plurality of cabin accessories such as a refrigerator, a television, a video game console, a microwave, device charging station(s), a continuous positive airway pressure (CPAP) machine, a coffee maker, or the like) powered by the APU prime mover. In an embodiment, when the load of the prime mover is below the predetermined threshold, the controller can be configured to send a notification to the user (e.g., the driver, the operator, or the like) to turn on the accessory components to drive up the load of the prime mover. It will be appreciated that in terms of power consumption, the heater can require at or about 70 to at or about 80 amps current (where the voltage is known in specific applications) when it is full running, while some accessory component(s) may require at or about 10 to at or about 15 amps current.

It will be appreciated that at 320, when the load of the prime mover is increased to a maximum allowable level but the load of the prime mover is still below the predetermined threshold, and/or no other load can be added to increase the exhaust temperature and the exhaust temperature is still below the minimum exhaust temperature, the controller can be configured to generate an alert to the user. In an embodiment, an alert informing of long term low exhaust temperatures can be generated.

It will also be appreciated that at 320, there can be multiple thresholds for the load of the prime mover. For example, there can be a minimum threshold (e.g., at or about 1.2 kilowatts). When the load of the prime mover is below the minimum threshold, the controller can start a counter/timer to determine how long it passes at such condition before increasing the load of the prime mover (e.g., turning on the DPF heater to mitigate the deposits). Such duration can be predetermined (e.g., an hour, a few hours, or the like). When the counter/timer exceeds the predetermined duration, the controller can be configured to increase the load of the prime mover (e.g., to turn on the DPF heater). In an example, there can be an intermediate threshold (e.g., at or about two kilowatts). When the load of the prime mover is below the intermediate threshold and at or above the minimum threshold, the controller can be configured to increase the load of the prime mover (e.g., turn on the DPF heater) with a waiting period longer than the predetermined duration for the minimum threshold. For example, when the load of the prime mover is below the minimum threshold, and when the counter/timer exceeds the predetermined duration (e.g., 100 units of time or the like), the controller can be configured to increase the load of the prime mover (e.g., to turn on the DPF heater). When the load of the prime mover is at or above the minimum threshold but below the intermediate threshold, and when the counter/timer exceeds a duration (e.g., 200 units of time or the like) that is greater than the predetermined duration (e.g., 100 units of time or the like), the controller can be configured to increase the load of the prime mover (e.g., to turn on the DPF heater). This is because if it takes the predetermined duration (e.g., 100 units of time or the like) to cause an issue in a condition that is below the minimum threshold, then at or above the minimum threshold but below the intermediate threshold, it may only develop such issue after a longer time (e.g., 200 units of time or the like). In an example, there can be a maximum threshold (e.g., at or about 2.2 kilowatts). When the load of the prime mover is above the maximum threshold, the controller can be configured to decrease the load of the prime mover (e.g., to turn off the DPF heater unless the DPF heater is needed or necessary) to revert the load of the prime mover back to the previous/original load (a status before performing the mitigation of the exhaust temperature issue). When the load of the prime mover is at or below the maximum threshold and at or above the intermediate threshold, the controller can be configured to take no actions regarding increasing or decreasing the load of the prime mover.

Back to 330 again, when the controller is configured to increase the load of the prime mover (e.g., to turn on the DPF heater), the controller can be configured to increase the load of the prime mover (e.g., to turn on the DPF heater) for a predetermined period of time (e.g., at or about 20 minutes, or the like), and then decrease the load of the prime mover (e.g., to turn the DPF heater off unless the DPF heater is needed or necessary) to revert the load of the prime mover back to the previous/original load (a status before performing the mitigation of the exhaust temperature issue). The method 300 proceeds back to 310.

Figure 4:
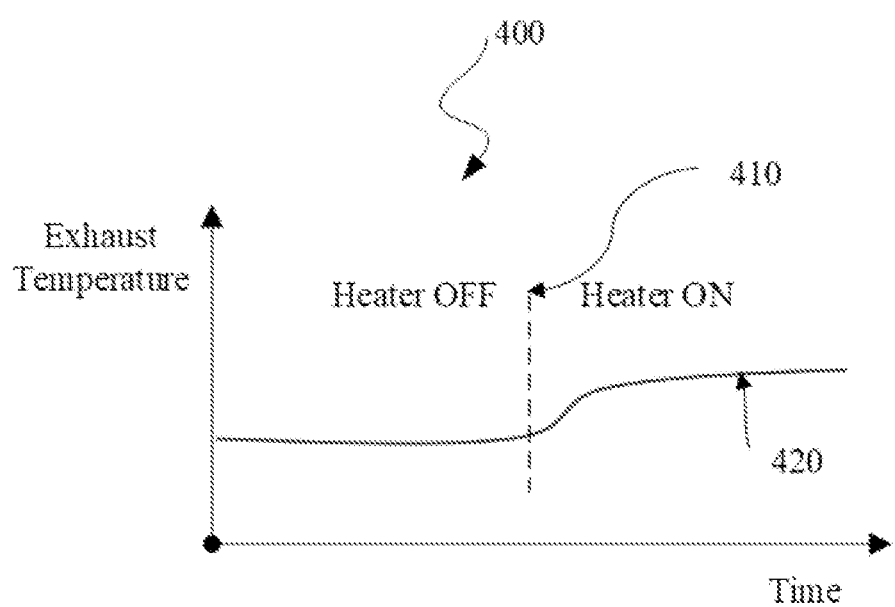
FIG. 4 illustrates a relationship between the exhaust temperature and the status of a diesel particulate filter (DPF) heater in a period of a time, according to an embodiment.

FIG. 4 illustrates a relationship 400 between the exhaust temperature and the status of a diesel particulate filter (DPF) heater in a period of a time, according to an embodiment. As shown in FIG. 4, the horizontal coordinate is the time (duration, in the unit of e.g., hours), and the vertical coordinate is the exhaust temperature. The point of time 410 indicates when the heater (e.g., the DPF heater 240 of FIG. 2) is turned on (from an "off" status), and the curve 420 indicates the exhaust temperature over a period of time. The area to the left of 410 indicates the time period when the heater is turned off, and the area to the right of 410 indicates the time period when the heater is turned on. As shown in FIG. 4, the exhaust temperature increases after the heater is turned on.

It will be appreciated that at low exhaust temperatures, when an engine is paired with a DPF, certain exhaust gas elements can collect on the face of the DOC (i.e., deposit formation) and eventually clog the DOC. A mechanical engine does not have an artificial means to raise the exhaust temperature independent of load to prevent or slow down the deposit formation. This can lead to poor engine run conditions and in some cases can lead to a thermal runaway event. The electrical element of the DPF (e.g., a DPF heater) can be energized at specific conditions while running at low exhaust temperature. This can increase the load on the alternator which is driven by the engine. This in turn can increase the load on the engine which increases the exhaust temperature reducing or in some cases eliminating the accumulation of deposits. One embodiment includes energizing element while engine is off to raise temperature around the DOC and then turning the engine on to provide oxygen to reduce or eliminate the deposits.

Embodiments disclosed herein can provide a DPF heater, which is typically used for regenerating the DPF when the engine is off, that is used for creating a load on the engine when the engine is running to raise the exhaust temperature.

Aspects:

It is appreciated that any of aspects 1-8 and 9-16 can be combined.

Aspect 1. A diesel particulate matter reduction system comprising:
a prime mover coupled with a generator, the prime mover being separate from another prime mover used for operating a vehicle; a compressor powered by the prime mover;
a diesel oxidation catalyst (DOC) disposed downstream from the prime mover; and
a controller,
wherein the controller is configured to:
determine a load of the generator,
determine a load of the compressor,
determine a load of the prime mover based on the determined load of the generator and the determined load the compressor, and
control the load of the prime mover to maintain a minimum exhaust temperature for the DOC.

Aspect 2. The system according to aspect 1, further comprising:
a diesel particulate filter (DPF) disposed downstream from the DOC; and
a DPF heater powered by the generator,
wherein the controller is configured to control the DPF heater to maintain the minimum exhaust temperature for the DOC.

Aspect 3. The system according to aspect 2, further comprising:
a relay,
wherein the controller is configured to control the relay to control the DPF heater.

Aspect 4. The system according to aspect 3, wherein the controller is configured to control the relay to turn on the DPF heater to maintain the minimum exhaust temperature for the DOC when the determined load of the prime mover is below a threshold.

Aspect 5. The system according to any one of aspects 2-4, wherein the DPF heater is integrated with the DPF.

Aspect 6. The system according to any one of aspects 2-4, wherein the DPF heater is disposed upstream from the DPF.

Aspect 7. The system according to any one of aspects 1-6, wherein the prime mover is a diesel engine.

Aspect 8. The system according to claim any one of aspects 1-7, wherein the generator is a belt-driven alternator.

Aspect 9. A method for maintaining a minimum exhaust temperature for a diesel oxidation catalyst (DOC) paired with a prime mover, the prime mover being separate from another prime mover used for operating a vehicle, the method comprising:
determining a load of a generator, the generator being coupled with the prime mover;
determining a load of a compressor, the compressor being powered by the prime mover;
determining a load of the prime mover based on the determined load of the generator and the determined load the compressor, and
controlling the load of the prime mover to maintain the minimum exhaust temperature for the DOC, the DOC being disposed downstream from the prime mover.

Aspect 10. The method according to aspect 9, further comprising:
controlling a diesel particulate filter (DPF) heater to maintain the minimum exhaust temperature for the DOC, the DPF heater being powered by the generator, wherein a DPF is disposed downstream from the DOC.

Aspect 11. The method according to aspect 10, further comprising:
controlling a relay to control the DPF heater.

Aspect 12. The method according to aspect 11, further comprising:
controlling the relay to turn on the DPF heater to maintain the minimum exhaust temperature for the DOC when the determined load of the prime mover is below a threshold.

Aspect 13. The method according to any one of aspects 10-12, wherein the DPF heater is integrated with the DPF.

Aspect 14. The method according to any one of aspects 10-12, wherein the DPF heater is disposed upstream from the DPF.

Aspect 15. The method according to any one of aspects 9-14, wherein the prime mover is a diesel engine.

Aspect 16. The method according to any one of aspects 9-15, wherein the generator is a belt-driven alternator.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:
1. A diesel particulate matter reduction system comprising:
a prime mover coupled with a generator, the prime mover being separate from another prime mover used for operating a vehicle;
a compressor powered by the prime mover;
a diesel oxidation catalyst (DOC) disposed downstream from the prime mover;
a diesel particulate filter (DPF) disposed downstream from the DOC;
a DPF heater powered by the generator, the DPF heater being configured for regenerating the DPF when the prime mover is off; and
a controller,
wherein the controller is configured to:
determine a load of the generator,
determine a load of the compressor,
determine a load of the prime mover based on the determined load of the generator and the determined load of the compressor,
control the load of the prime mover to maintain a minimum exhaust temperature for the DOC,
when the load of the prime mover is below a threshold, start a timer to determine a duration of a condition that the load of the prime mover is below the threshold,
when the duration exceeds a predetermined time duration, turn on the DPF heater to maintain the minimum exhaust temperature for the DOC, and when the duration is at or below the predetermined time duration, turn off the DPF heater.

2. The system according to claim 1, further comprising:
a relay,
wherein the controller is configured to control the relay to control the DPF heater.

3. The system according to claim 2, wherein the controller is configured to control the relay to turn on the DPF heater to maintain the minimum exhaust temperature for the DOC when the determined load of the prime mover is below the threshold.

4. The system according to claim 1, wherein the DPF heater is integrated with the DPF.

5. The system according to claim 1, wherein the DPF heater is disposed upstream from the DPF.

6. The system according to claim 1, wherein the prime mover is a diesel engine.

7. The system according to claim 1, wherein the generator is a belt-driven alternator.

8. The system according to claim 1, wherein the prime mover includes a shaft, and the generator and the compressor are loads on the shaft.

9. The system according to claim 8, wherein the load of the prime mover is a sum of the load of the generator and the load of the compressor.

10. The system according to claim 1, wherein the controller is further configured to:
turn off the DPF heater when the load of the prime mover is above a maximum threshold.

11. The system according to claim 1, wherein the controller is further configured to:
turn on the DPF heater when the load of the prime mover is below an intermediate threshold and at or above the threshold for a waiting period longer than the predetermined time duration.

12. A method for maintaining a minimum exhaust temperature for a diesel oxidation catalyst (DOC) paired with a prime mover, the prime mover being separate from another prime mover used for operating a vehicle, a diesel particulate filter (DPF) being disposed downstream from the DOC, a DPF heater being powered by a generator, the DPF heater being configured for regenerating the DPF when the prime mover is off, the method comprising:
determining a load of the generator, the generator being coupled with the prime mover;
determining a load of a compressor, the compressor being powered by the prime mover;
determining a load of the prime mover based on the determined load of the generator and the determined load of the compressor;
controlling the load of the prime mover to maintain the minimum exhaust temperature for the DOC, the DOC being disposed downstream from the prime mover; and
when the load of the prime mover is below a threshold, starting a timer to determine a duration of a condition that the load of the prime mover is below the threshold,
when the duration exceeds a predetermined time duration, turning on the DPF heater to maintain the minimum exhaust temperature for the DOC, and
when the duration is at or below the predetermined time duration, turning off the DPF heater.

13. The method according to claim 12, further comprising:
controlling a relay to control the DPF heater.

14. The method according to claim 13, further comprising:
controlling the relay to turn on the DPF heater to maintain the minimum exhaust temperature for the DOC when the determined load of the prime mover is below the threshold.

15. The method according to claim 12, wherein the DPF heater is integrated with the DPF.

16. The method according to claim 12, wherein the DPF heater is disposed upstream from the DPF.

17. The method according to claim 12, wherein the prime mover is a diesel engine.

18. The method according to claim 12, wherein the generator is a belt-driven alternator.

* * * * *